Patented Aug. 9, 1949

2,478,694

UNITED STATES PATENT OFFICE 2,478,694

LUBRICANT

Harris D. Hineline, Mount Vernon, N. Y., and David W. Young, Roselle, N. J., assignors to Standard Oil Development Company, a corporation of Delaware No Drawing. Application April 23, 1946, Serial No. 664,438

17 Claims. (Cl. 252—49.9)

This invention relates to thickened lubricants having an improved viscosity index; relates especially to thickened lubricants of improved viscosity index which have extreme pressure properties; and relates particularly to lubricants containing phosphorus chloride treated, cyclicized polymers such as polymethyl pentadiene which has been cyclicized and treated with a phosphorus halide.

A number of oil soluble substances have been found, which serve, when dissolved in lubricants, to thicken the lubricant and also to improve its viscosity index; that is, to reduce the rate of change of viscosity with change in temperature of the lubricant. Among the best of these has been polyisobutylene. Polyisobutylene, however, lacks extreme pressure lubricating properties, and while the viscosity index of a lubricating oil containing polyisobutylene is excellent, it does not stand up well under conditions where lubrication of surfaces under extremely heavy pressure is required. On the other hand, various substances have been offered which contain such inorganic radicals as sulfur and chlorine and various metals, etc., which improve the extreme pressure properties of the lubricant, but do not sufficiently improve the viscosity index; and difficulty is encountered in adding both agents and obtaining satisfactory results.

The present invention provides a single soluble addition agent which, in a single substance, contains both viscosity index improving elements and extreme pressure improving elements and is found to yield an excellent viscosity index, and, simultaneously, excellent extreme pressure properties.

For this purpose a polymerizable polyolefin such as 2-methyl pentadiene-1,3 is polymerized at low temperatures by the application of a Friedel-Crafts catalyst dissolved in a low freezing, non-complex forming solvent; to yield a high molecular weight polymer; which may then be cyclicized if desired by the application of an appropriate cyclicizing agent such as p-toluene sulfonic acid or aluminum bromide or stannic chloride or the like. The polymer, either cyclicized or uncyclicized, is then treated, preferably at an elevated temperature, with a phosphorus halide. The preferred treating substance is phosphorus trichloride. Alternatively, however, any of the simple or mixed phosphorus halides may be used, such, for example, as phosphorus pentachloride ($PCl_5$) or phosphorus tribromide ($PBr_3$) or phosphorus pentabromide ($PBr_5$), phosphorus triiodide ($PI_3$) or the double halide known as phosphorus chlorobromide ($PCl_3Br_8$) or phosphorus trifluoride ($PF_3$) or phosphorus pentafluoride ($PF_5$), or the mixed halide of phosphorus with chlorine and fluorine ($PCl_2F_3$) or phosphorus bromochloride ($PBrCl_4$), or any of the other simple or mixed phosphorus halides. This treatment adds into the polymer (or into the oil blend containing the polymer) a considerable quantity of combined halogen and a usually smaller quantity of combined phosphorus; which, together yield very effective extreme pressure properties; while the high molecular weight of the cyclicized polymer yields the desired thickening and the desired improvement in viscosity index.

The phosphorus halide treated polymer is particularly useful in the preparation of high viscosity-index lubricants with extreme-pressure properties. The product is not, however, limited to such uses, since it is of particular value for the preparation of a wide range of composite substances which are useful as coating compounds, adhesives, dye intermediates and the like. The preferred embodiment of the invention produces a relatively high molecular weight polymer and combines into this polymer substantial, but relatively small, amounts of the phosphorus halide. The invention is not, however, limited to high polymer, but is applicable to the lower polymers such as dimer, trimer, tetramer and the like, to yield materials which are readily reactive with still other substances for the production of dye intermediates for high molecular weight dye-stuffs in which the relatively high molecular weight polymer serves as a weighting member to change the resonance frequency of the dye-stuff. That is, the phosphorus halide treated polymer may be prepared in any desired molecular weight, and, regardless of the original inertness of the polymer, after the phosphorus halide treatment it is readily reacted either through, or by removal of a phosphorus or halogen atom, to yield a wide range of reactions and substances in which the molecular weight of the resulting compound is readily controlled by the choice of molecular weight in the reactive polymer.

The treatment with the phosphorus halides may be conducted merely by adding the phosphorus halide to the polymer. Usually, however, it is preferable that the polymer be in solution in an inert solvent such as carbon disulfide, carbon tetrachloride or chloroform or the like, since the reaction proceeds more smoothly when the polymer is in solution. Also, the reaction may be facilitated by the presence of a peroxide type of catalyst such as benzoyl peroxide or acetyl peroxide or diacetyl peroxide or the like. It is possible to mix together the polymer, the phosphorus halide, and the peroxide catalyst in a Banbury mixer or on the roll mill, and obtain a satisfactory reaction. Usually, however, the reaction proceeds more smoothly and satisfactorily if the polymer is dissolved in an inert solvent and the phosphorus halide and peroxide catalyst applied to the material in solution; with gentle heating if desired.

Thus the present invention provides a new composition of matter comprising a hydrocarbon solution of a cyclicized polymer such as polymethyl pentadiene containing combined halogen and combined phosphorus which may, if desired, be dissolved in a hydrocarbon lubricant to yield a solution which remains liquid at low temperatures, and retains its body at relatively high temperatures. Other objects and details of the invention will be apparent from the following description.

This application is a continuation in part of our copending application Serial 544,148, filed July 8, 1944, now U. S. Patent No. 2,406,575.

The raw material for the present invention is a relatively high molecular weight polyolefinic polymer which is preferably capable of cyclization. The preferred raw material is polymethyl pentadiene; that is the polymer of 2-methyl pentadiene-1,3 which polymerizes at low temperature quite readily into high molecular weight polymers, and when so polymerized cyclicizes quite readily, with a minimum of loss of molecular weight. It appears that the cyclization reaction occurs between adjacent residual double linkages with a minimum of breakage of the main linear chain of the molecule. Alternatively, almost any of the other high molecular weight polyolefinic polymers are useful. Thus, such polyolefins as 2,5-methyl pentadiene-1,3 or 2-methyl 5-ethyl pentadiene-1,3 or the like are similarly useful. That is, the polyolefins having more than 5 carbon atoms per molecule, in which there is an aliphatic substituent on the second carbon atom with a double linkage between the first and second carbon atom are particularly useful because of the ease of cyclization. Those compounds which are conjugated, that is, contain two double linkages separated by a single linkage, are preferred, but the condition of conjugation is not necessary. The limiting molecular size of the compounds is still unknown, but compounds as high as 12 or 14 carbon atoms per molecule are useful. All of these diolefins polymerize reasonably readily, cyclize readily, are soluble in hydrocarbons when polymerized and cyclicized, and are reactive with the phosphorus halides. Similarly, the triolefins including such substances as myrcene are very desirable raw materials, since they polymerize readily, cyclicize readily, are oil-soluble when polymerized and cyclicized, and combine readily with the phosphorus halides after cyclization. Similarly, the triolefin known as allo-ocymene is equally advantageously useful. These substances are representative of polyolefins which polymerize at temperatures below 0° C. into oil soluble polymers having molecular weights above 3000, 4000 or 5000, up to several hundred thousand, with iodine numbers ranging from about 100 to 300 or above, which are readily cyclicized to reduce the overall unsaturation, yet retain, in the cyclicized condition, sufficient unsaturation to be reactive with phosphorus halide and when so reacted, combine with the phosphorus and halogen in such a way that the solubility in hydrocarbons remains good, the inorganic atoms are solidly held so that the compound is stable, yet the inorganic atoms are so placed as to result in an effective extreme pressure improvement.

Of these compounds, the polymer of 2 methyl pentadiene-1,3 is preferred.

In preparing this polymer, methyl pentadiene of good purity is used. In the examples hereinafter given, a methyl pentadiene having a boiling point of 75° C. to 77° C. (at 760 mm. of Hg), a density of 0.7113 and an index of refraction $N_D^{20}$ 1.4472 was used. This material has a purity better than 95%, and further determinations indicate that its purity is in fact approximately 98%. The methyl pentadiene is cooled to a temperature about between 0° C. and —164° C. (preferably to a temperature between —40° C. as set by liquid propane, and —103 C. as set by liquid ethylene). The methyl pentadiene by itself may be cooled, by the application of a refrigerating jacket to the polymerization reactor. Alternatively the methyl pentadiene may be diluted with such substances as the lighter hydrocarbons or the alkyl, mono, or polyhalides or by di fluoro ethane ($CH_3$—$CH_2$—$CF_2H$) or carbon disulfide or the like. Alternatively the methyl pentadiene may be cooled by an internal refrigerant-diluent. For this purpose such substances as liquid propane or liquid ethane or liquid ethylene or even liquid methane may be used; or the material may be cooled by solid carbon dioxide, or by dissolved liquid carbon dioxide; under vacuum if lower temperatures are desired.

The cold methylpentadiene is then polymerized by the application of a Friedel-Crafts catalyst which preferably is in solution in a low freezing noncomplex forming solvent. The Friedel-Crafts catalyst may be substantially any of the substances disclosed by N. O. Calloway in his article on "The Friedel-Crafts synthesis" printed in the Journal of Chemical Reviews, published for the American Chemical Society at Baltimore in 1935 in volume XVII, No. 3, the article beginning on page 327, the list being particularly well shown on page 375. These Friedel-Crafts active metal halides may be used as such in single salts, or may be used as double salts or complexes of several metals or several halides or even with alkoxy substituents. These catalysts may be solid, liquid or gaseous (boron trifluoride being gaseous, titanium tetrachloride being liquid; most of the remainder being solids).

For the solvent, the alkyl monohalides are preferred such as methyl or ethyl chloride. Other alkyl mono or polyhalides having melting points below 0° C. are also useful; as is carbon disulfide. All of these substances show an adequate solvent capacity for the Friedel-Craft halides, especially aluminum chloride which is the preferred catalyst. Alternatively, and especially where catalyst complexes containing several halides are used, the lighter hydrocarbons such as propane, butane, pentane, hexane, and the like may be used; the principal requirements being a solubility of at least 0.5% for the active methyl halides and a freezing point below 0° C. (thereby being "low freezing").

The solvent is also non-complex forming, meaning thereby that it can be boiled away from the solution with a purely nominal rise in temperature of less than one or two degrees over the boiling point of the pure solvent, to leave behind the residue of catalyst substance which is substantially free from solvent. (Or in the case of boron trifluoride, the solvent and solute boil away simultaneously with substantially the same change in temperature.)

The catalyst solution may be added to the cold olefinic material in any convenient manner which will bring the catalyst solution quickly into intimate dispersion in the cold olefin. A convenient method is to spray the catalyst solution through a nebulizer on the surface of the rapidly stirred cold olefinic material. Alternatively, the catalyst solution may be jetted into a zone of high turbulence in the cold olefinic material such as the region near to a rapidly rotating propeller stirrer. Many other means for adding the catalyst are, however, available.

The reaction proceeds rapidly to yield the desired polymer, and the conversion may be carried to a yield of from 40–50% of the amount of methylpentadiene present, to a yield as high as 90–95%. Such high yields are, however, less desirable since the range of molecular weight is greater. When the reaction has reached the desired stage, the catalyst supply is interrupted. The solid polymer may be recovered in any desired manner; merely by boiling off residual unpolymerized methylpentadiene; and, refrigerate if present, or the reaction mixture may be treated with warm water or warm alcohol or warm naphtha, with or without small quantities of alcohol or the like.

The resulting polymer may have a molecular weight almost anywhere between 1000, 3000 or 12,000 and 30,000 to 100,000, depending upon the lowness of the polymerization temperature, the purity of the methylpentadiene, the presence and purity of diluent-refrigerant, and the character of catalyst chosen. The preferred molecular weight is within the range between about 5000 and 35,000 to 45,000 since higher molecular weights break down somewhat more easily in service and lower molecular weights require an undue amount of polymer to give a desirable amount of thickening. The polymer, as produced, may have an iodin number (as determined by the Wijs method) in the neighborhood of 300, or somewhat less depending upon the presence or absence of small amounts of cyclization, occurring during the polymerization reaction.

After being brought up to room temperature, the polymer is dried in any convenient manner and then is ready for the cyclization, which may be conducted in several ways. A preferred method is to put the polymer on the double roll mill at a moderate temperature, and mill into the polymer from 1% to 10% or 15% of p-toluene sulfonic acid, continuing the milling until a thoroughly homogeneous mixture is obtained. The mixture is then removed from the mill and heated to a temperature approximately 100° C. for 30 to 60 minutes. This treatment effectively cyclicizes the polymer and by the cyclization reduces the iodine number to a value of approximately 20 to 50. The polymer mixture may then be cooled to room temperature and is ready for the dissolving step.

Alternatively, the polymer may be dissolved in light naphtha and treated with stannic chloride at temperatures ranging from 20° C. to 80° C. for time intervals ranging from 15 minutes to 80 hours. This treatment also is effective for cyclization, and likewise reduces the iodine number to approximately 15 to 50.

Other methods which will be obvious to those skilled in the art may likewise be used for this cyclization step. The polymer is then ready for the phosphorus halide treatment.

As pointed out above, the invention is not limited to cyclicized polymethyl pentadiene as the raw material, but any polymer of a multi-olefin or any polymer containing a substantial proportion of copolymerized multi-olefin is useful for the present invention. The low polymers of butadiene, i. e., dimer, trimer, tetramer, etc., are particularly useful for certain aspects of the present invention. The similar low polymers of isoprene, piperylene, dimethyl butadiene, dimethallyl, myrcene, alloocymene and the like, up to about 14 carbon atoms, are similarly useful. The low temperature copolymers of olefins in which a substantial amount of the multi-olefin is copolymerized are similarly useful without regard to the molecular weight.

Also of considerable value are the co-polymers of 2-methyl pentadiene with isoprene; especially co-polymers in which the amount of isoprene is held below 10%. These also are highly useful, since they cyclicize readily and when cyclicized are readily reactive with the phosphorus halides. These polymers are all low temperature polymers, but the reaction of the present invention is not limited to such polymers only. Alternately, the emulsion polymers of butadiene, either as such or the co-polymers with styrene or with acrylo nitrile may also be used since they cyclicize readily to bring the iodine number to a desirably low value and are then readily reactive with the phosphorus halides. Similar emulsion polymers using isoprene instead of the butadiene, or the piperyline or the like, are also similarly usable.

The polymer is then dissolved in a concentration of from 0.5% to 10% or 15% in the desired hydrocarbon lubricant. For the production of a fluid lubricant, a high grade, well refined oil having a viscosity at 210° F. of from 30 S. S. U. to 70 S. S. U. may be used, sufficient polymer being dissolved in the oil to bring the viscosity and viscosity index to the desired values. Alternatively, if a heavy grease is to be made, a much heavier lubricant stock may be utilized and the various addition agents used to make heavy greases may be incorporated; together with from 1% to 15% or 20% of the polymer.

To this solution there is then added a substantial quantity of the phosphorus halide, the amount ranging from 1% to 10% or 15% of the amount of cyclicized polymer. The oil solution is then heated to temperatures ranging from 150° C. to 225° C. for from 15 minutes to 150 minutes. The solution is then filtered to remove any uncombined phosphorus halide, and any insoluble reaction products, the material being preferably filtered while hot because of the more rapid filtering rate. In the preparation of greases it is, of course, desirable that the auxiliary components be added after the filtration step.

The above outlined procedure applies particularly to methylpentadiene, and to its polymers and copolymers, but substantially the same procedure may be applied to a wide range of polymerizable substances, polymers, and high molecular weight substances in general, it being merely necessary that they be capable of cyclization; when cyclicized be soluble in hydrocarbons, and when cyclicized retain a sufficiently high iodine number, and a sufficient amount of unsaturation to combine with the phosphorus halide.

Thus, for instance, an interpolymer of isobutylene with a polyolefin having more than 5 carbon atoms in which a substantial quantity of the polyolefin is interpolymerized, is similarly useful, especially with polyolefins up to 12 or 14 carbon atoms per molecule and especially when the quantity of polyolefin interpolymerized is substantial in amount. That is, it is desirable that the iodine number of the cyclicized polymer be above 5, and it is also essential that the cyclicized polymer be oil-soluble. This latter requirement eliminates the low temperature polymers of simple butadiene, isoprene and pentadiene and low temperature copolymers containing substantial portions of butadiene.

It is further essential that to be useful, the polymers must cyclicize with a minimum of cross linkages, between molecules, which is found to be characteristic of the polyolefins having more than 5 carbon atoms. Thus, copolymers of isobutylene with butadiene or isoprene or piperylene, containing from 2% to 15% or 20% of butadiene are usable. Copolymers of isobutylene with dimethyl butadiene, myrcene, dimethallyl and the like, up to 12 or 14 carbon atoms, are usable, especially when the proportion of interpolymerized diolefins exceeds 5% or 10%. Likewise, as will be evident from the above description, these polyolefins may be used with any proportion of isobutylene, down to zero.

It may be noted that the phosphorus halide treatment of the cyclicized polymer introduces halogen and phosphorus into the molecule without the establishment of any cross linkage, differing in that respect from vulcanization, which introduces a maximum of cross linkages into the compound between adjacent molecules. It may be noted that the introduction of cross linkages destroys the oil-solubility, whereas the introduction without cross linkages retains the oil-solubility and it is of the essence of the present invention that, broadly, the polymer is cyclicized and phospho-halogenated without the introduction of cross linkage, in order to obtain a compound of high molecular weight which remains oil soluble and contains substantial quantities of combined halogen and phosphorus. Accordingly, the invention is applicable to any polymer which can be cyclicized and combined with phosphorus halide without the formation of sufficient cross linkages to destroy the solubility in hydrocarbons.

Example 1

A mixture was prepared consisting of approximately 100 parts by volume of methyl pentadiene having a purity of approximately 98% and 400 parts of liquid ethylene. The presence of the liquid ethylene cooled the material to a temperature of approximately $-103°$ C. This mixture was then polymerized by the addition of approximately 75 parts by volume of a solution of aluminum chloride in methyl chloride in a concentration of approximately 0.8%. The polymerization was conducted by spraying the catalyst solution onto the surface of the rapidly stirred olefinic material. The polymerization proceeded rapidly to yield a solid polymer having a molecular weight (by the Staudinger method) of approximately 44,000. The polymerization mixture was then thrown into warm water to volatilize residual traces of refrigerant and to separate out any unpolymerized methyl pentadiene. The yield of polymer was approximately 69%. The solid polymer was then placed on a double roll mill and washed with water until most of the residual traces of catalyst and monomer were removed. When this stage was reached, approximately 10 parts by weight (per 100 of polymer) of p-toluene sulfonic acid were added and thoroughly milled into the solid polymer. The milling was continued until a thoroughly homogeneous mixture was obtained. The mixture was then placed in a hot air oven at 100° C. for 20 minutes. The polymer mixture was then cooled and approximately 50 parts by weight of the polymer were dissolved in 1000 parts by weight of carbon tetra chloride. When the solution was about complete, approximately 50 parts by weight of phosphorus trichloride (PCl₃) was added and well stirred in. The mixture was then heated to a temperature of 65° C. for 160 minutes, the mixture being well stirred during the heating period. At the end of the 60 minutes the mixture was cooled to approximately 35° C. and filtered through a paper filter. Isopropyl alcohol (99%) was then added to precipitate the PCl₃ treated polymer from CCl₄ solution. The polymer was then added to a lubricating oil which had a viscosity at 100° F. of 128 S. S. U., a viscosity at 210° F. of 42 S. S. U., and a V. I. of 109. The amount of polymer added to the oil was 5% by weight. Chemical analysis of the clear, oil blend showed that the polymer contained 0.6% of combined phosphorus and 1.94% of combined chlorine. Viscosity determinations and viscosity index determinations showed the following inspection results:

| S. S. U. at 100° F | S. S. U. at 210° F. | V. I. |
| --- | --- | --- |
| 264 | 57 | 137 |

These determinations show that the resulting oil has an excellent viscosity and an excellent viscosity index.

Portions of this oil were then charged into the Almen machine for the shock loading test. All 15 weights (2 lbs. each) were placed on the arm and allowed to drop simultaneously. The oil carried all 15 weights under this shock loading and after the test the pin and bushing, which were made of steel, were in good condition.

Example 2

A mixture was prepared consisting of 100 parts by weight of 2-methyl pentadiene 1-3, having a boiling point of 75.8° C. and a refractive index of 1.4479 and 300 parts by weight of liquid ethane; the addition of which brought the temperature of the mixture to approximately $-87°$ C. This mixture was then polymerized by the addition thereto of approximately 50 parts of a solution of aluminum chloride in ethyl chloride having concentration of 1.8%. The catalyst solution was added in the form of a spray onto the surface of the rapidly stirred cold mixture. The polymerization proceeded rapidly to yield a solid, somewhat plastic, somewhat elastic polymer having an intrinsic viscosity (in solution in iso octane) of 1.6. When the polymerization had reached a desirably advanced stage the cold mixture was discharged into warm water, to volatilize out the unpolymerized residual olefine, residual ethane, and the catalyst solvent. The yield of dry polymers amounted to 76% of the original methyl pentadiene.

Fifty parts by weight of the dry polymer were then placed on the double roll mill and treated with 5 parts by weight of p-toluene sulfonic acid; the acid being well mixed into the polymer on the mill, while the temperature was held at approximately 40° C.; approximately five minutes milling being required. This mixture was then removed from the mill, heated to 80° C. for three hours and then cooled to room temperature. This procedure cyclicized the polymer and brought the iodine number to a desirable low value.

After the cyclicization steps, 20 parts by weight of the cyclicized polymer were dissolved in 500 parts by weight of carbon disulfide. When the solution was completed, approximately 10 parts by weight of phosphorus trichloride and the 3 parts by weight of diacetyl peroxide were added. The mixture was then stirred somewhat vigorously at room temperature for 48 hours and then filtered through a paper filter to remove small amounts of unreacted phosphorus halides and traces of insoluble cross-linked polymer.

The reaction product was then separated from the solution by the addition thereto of an equal volume (100 parts) of ethyl ether together with 30 parts by weight of iso-propyl alcohol and 30 parts of methyl alcohol. This procedure precipitated the treated polymer from the solution and it was separated by decanting off the liquid.

The solid, treated polymer was then air dried for three days and analyzed for viscosity and per cent content of phosphorus and chlorine to yield the following inspection record:

Intrinsic viscosity in diisobutylene _____ 0.42
Per cent P in resin _____ 0.53
Per cent Cl in resin _____ 0.91

Five parts by weight of the treated polymer were then added to 100 parts by weight of a good grade of lubricating oil having a viscosity at 210° F. of 52 S. S. U. and a viscosity index of 98. The solution of treated polymer in this oil, upon test, showed the followed inspection results:

| S. S. U. Viscosity at 100° F. | S. S. U. at 210° F. | V. I. |
|---|---|---|
| 357 | 65 | 134 |

These results show that the resulting oil has an excellent viscosity and an excellent viscosity index.

Other portions of this oil product were then charged into the Almen machine for the usual run. At the end of the 30 seconds, the successive 2 lb. weights were added at 10 second intervals until the full number of 15 weights had been added. The oil carried all 15 weights. The pin and bushing were made of steel and at the end of the test the pin and bushing were in good condition, showing the excellent extreme pressure properties of the lubricant.

Example 3

A mixture was prepared consisting of 3 parts by weight of isoprene, 97 parts by weight of 4-methyl pentadiene, 1-3 and 185 parts by weight of pulverized solid carbon dioxide. The methyl pentadiene showed a boiling point of 76.72° C. and a refractive index of 1.4534. The presence of the solid $CO_2$ brought the temperature of the mixture to approximately −78° C.

When this temperature was reached there was added to the mixture approximately 100 parts by weight of a solution of aluminum chloride in methyl chloride having a concentration of 0.59%. The catalyst solution was added in the form of a fine spray onto the surface of the rapidly stirred olefinic mixture. The polymer formed promptly and this amount of catalyst solution yielded an amount of finished polymer equal to approximately 79% of the mixed olefins. When the reaction had reached this stage, the cold mixture was dumped into warm water to volatilize out the unreacted olefins, the catalyst solvent, and the residual solid $CO_2$. The solid polymer was then separated and dried. The dried polymer was found to have an intrinsic viscosity (in toluene solution) of 0.9.

One hundred parts by weight of this polymer were treated on the mill with 8 parts by weight of p-toluene sulfonic acid and 14 parts by weight of phosphorus penta chloride ($PCl_5$). Milling was continued for approximately 30 minutes at 80° C. Tests of the resulting polymer showed the following inspection record:

Intrinsic viscosity _____ 0.372
Per cent P _____ 0.96
Per cent Cl _____ 3.21
Iodine No _____ 47.00

Five parts by weight of this polymer were then dissolved in 100 parts by weight in a good grade of mineral oil, the solution being made at 125° F. to insure rapid and efficient solution. The mineral oil used had a viscosity index of 112 and a viscosity at 210° F. of 43 S. S. U. This oil blend carried all 15 weights on the Almen machine under gradual loading conditions.

Example 4

A mixture was prepared consisting of 60 parts by weight of diisobutylene and 40 parts by weight of butadiene. This mixture was prepared in a heat insulated propane cooled reactor which was equipped with a reflux condenser cooled by solid $CO_2$. The temperature of this mixture, with refluxed cooling, was held to approximately −25° C. To this mixture there was then added approximately 15 parts by weight of aluminum chloride in solution in ethyl chloride in a 3.3% concentration. This catalyst solution was added in the form of a very fine high pressure jet into the body of the cold mixture, approximately an hour and 10 minutes being required for the addition of the catalyst. This amount of catalyst polymerized approximately 60% of the olefinic material present. When the catalyst was all added, and the reaction substantially completed, approximately 30 parts by weight of isopropyl alcohol were added to inactivate the catalyst. This polymerizate mixture was then discharged into 800 parts by weight of hot mineral lubricating oil. This volatalized out the unreactive olefins, the propane, and the catalyst solvent. The polymer dissolved in the hot oil and the solution was then cooled, filtered, and treated at room temperature with 30 parts by weight of phosphorus trichloride. The resulting mixture was stirred vigorously and then filtered through paper to remove residual portions of unreacted phosphorus trichloride.

Inspection tests show that this solution had good viscosity, an excellent viscosity index; and extreme pressure properties, nearly as good as those of the previous examples.

These results indicate that the oil prepared as above described is a high grade lubricant having a very advantageous viscosity index and very valuable extreme pressure properties.

While there are above disclosed but a limited number of embodiments of the invention, it is possible to provide still other embodiments without departing from the inventive concept herein disclosed and it is, therefore, desired that only such limitations be imposed upon the appended claims as are stated therein or required by the higher art.

What we claim is:

1. The method of preparing a lubricant comprising the steps of polymerizing a polyolefin having from 6 to 14 carbon atoms per molecule to a molecular weight within the range between three thousand and several hundred thousand, cyclicizing the polymer, chemically combining the cyclicized polymer with a phosphorus halide and dissolving .5 to 20% of the cyclicized chemically combined phosphorus compound containing polymer in a mineral base oil lubricating material.

2. The method of preparing a lubricant comprising the steps of polymerizing a polyolefin having from 6 to 14 carbon atoms per molecule to a molecular weight within the range between three thousand and several hundred thousand, cyclicizing the polymer, dissolving the cyclicized polymer in a mineral base lubricating oil, chemically combining the cyclicized polymer with a phosphorus halide, to incorporate from .5 to 20% of the cyclicized chemically combined phosphorus compound containing polymer in the mineral base lubricating oil.

3. The method of preparing an improved lubricant comprising the steps of polymerizing a multiolefine having from 4 to 14 carbon atoms per molecule to a molecular weight within the range between three thousand and several hundred thousand, cyclicizing the polymer, dissolving the cyclicized polymer in an inert solvent, treating the solution with a phosphorus halide to yield a chemical combination of polymer, phosphorus and halogen, filtering this solution, precipitating the reacted polymer containing chemically combined phosphorus and halogen from the solution and dissolving from 0.5% to 20% of the recovered cyclicized, phosphorus halide containing polymer in a mineral oil base lubricant.

4. An improved lubricant consisting essentially of mineral base lubricating oil having dissolved therein 0.5 to 20% of a cyclicized polymer polyolefin which has a phosphorus halide chemically combined therein, said polymer having a Staudinger molecular weight within the range between 3000 and several hundred thousand and an iodine number between five and fifty.

5. An improved lubricant consisting essentially of mineral base lubricating oil containing dissolved therein 0.5 to 20% of a cyclicized polymerized polyolefin having phosphorus chloride chemically combined therein to an extent sufficient to substantially improve the load bearing properties of said oil, said polymer having a molecular weight between 3000 and several hundred thousand and having an iodine number between 5 and 50.

6. An improved lubricant consisting essentially of a mineral base lubricating oil having dissolved therein 0.5% to 20% of a cyclicized polymer of a polyolefin having more than 5 carbon atoms per molecule, said polymer having phosphorus pentachloride chemically combined therein in amount sufficient to substantially increase the load bearing properties of said oil, said polymer also having a molecular weight between 3000 and several hundred thousand and having an iodine number between 5 and 50.

7. An improved lubricant consisting essentially of a mineral base lubricating oil having dissolved therein 0.5 to 20% of a cyclicized polymer of a polyolefin having more than 5 carbon atoms per molecule, said polymer containing phosphorus trichloride chemically combined therein in sufficient proportions to substantially improve the load-bearing properties of said oil, said polymer also having a molecular weight between 3000 and several hundred thousand and having an iodine number between 5 and 50.

8. An improved lubricating composition consisting essentially of a mineral base oil lubricant having dissolved therein 0.5 to 20% of a cyclicized polymer of polyolefin having 6 to 14 carbon atoms, said polymer containing phosphorus halide chemically combined therein, said polymer also having a molecular weight between 3000 and 100,000 and having an iodine number between 5 and 50.

9. Composition according to claim 8 wherein said polyolefin is methyl pentadiene.

10. Composition according to claim 8 wherein said polyolefin is 4, methyl pentadiene, 1-3.

11. Composition according to claim 8 wherein said polyolefin is 2, methyl pentadiene, 1-3.

12. Composition according to claim 4 wherein said polymer is a copolymer of a polyolefin with a mono-olefin.

13. Composition according to claim 4 wherein said polymer is a copolymer of diisobutylene and butadiene.

14. Process as in claim 1 wherein said polyolefin is a methyl pentadiene and the phosphorus halide is phosphorus chloride.

15. Process as in claim 1 wherein said polyolefin is a methyl pentadiene, p-sulfonic acid is employed to catalyze the cyclicization, and the phosphorus halide is phosphorus chloride.

16. Process according to claim 1 wherein stannic chloride is used to catalyze cyclicization.

17. Process according to claim 1 wherein said phosphorus halide is phosphorus pentachloride.

HARRIS D. HINELINE.
DAVID W. YOUNG.

REFERENCES CITED

The following references are of record in the file of this patent:

UNITED STATES PATENTS

| Number | Name | Date |
|---|---|---|
| 2,262,813 | Morway et al. | Nov. 18, 1941 |

OTHER REFERENCES

"Derivatives of synthetic rubber," by H. A. Endres in "Rubber Chemistry and Technology," vol. 17, pages 903 and 904, Oct. 1944.